P. H. SPOELSTRA.
AUTOMOBILE CHAIN AND LOCK.
APPLICATION FILED JULY 29, 1919.
1,386,442.
Patented Aug. 2, 1921.
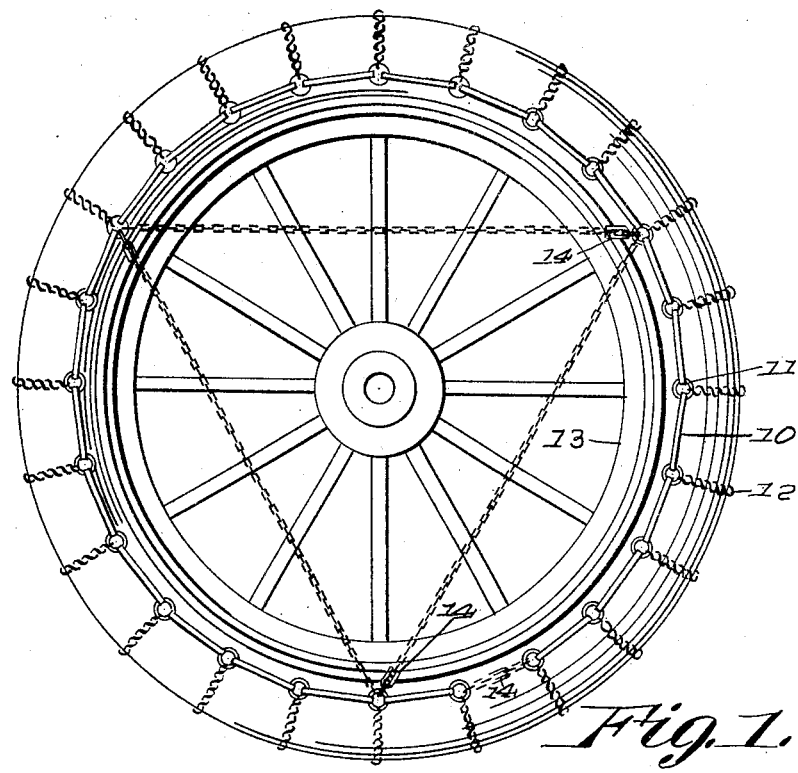
Fig. 1.
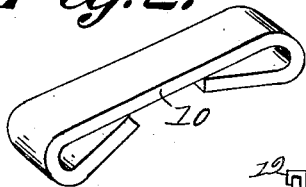
Fig. 2.
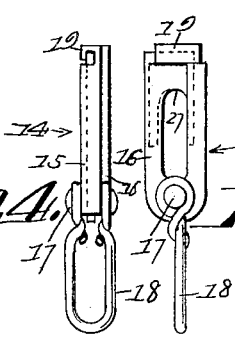
Fig. 4.
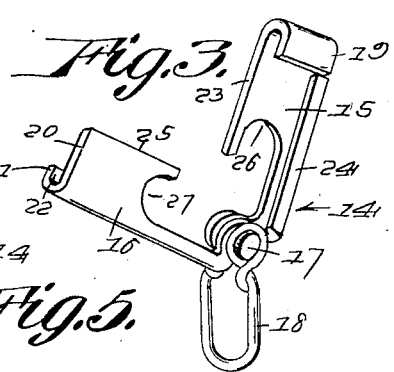
Fig. 3.
Fig. 5.
Inventor
P. H. Spoelstra,
By G. Hume Talbert
Attorney

UNITED STATES PATENT OFFICE.

PETER H. SPOELSTRA, OF PELLA, IOWA.

AUTOMOBILE CHAIN AND LOCK.

1,386,442.  Specification of Letters Patent.  Patented Aug. 2, 1921.

Application filed July 29, 1919. Serial No. 314,007.

*To all whom it may concern:*

Be it known that I, PETER H. SPOELSTRA, a citizen of the United States of America, residing at Pella, in the county of Marion and State of Iowa, have invented new and useful Improvements in Automobile Chains and Locks, of which the following is a specification.

The object of the invention is to provide an automobile traction or anti-skid chain with means whereby it may be readily attached to and locked upon the wheel tire under such conditions as to prevent accidental displacement under the severe strains to which devices of this class are subjected, and at the same time to provide the chain with means whereby the slack which is ordinarily permitted in the chain is prevented from causing contact of the chain with the wheel guards or other parts of the automobile when the vehicle is in motion.

Further objects and advantages of the invention will appear in the following description, it being understood that changes in form and proportion may be resorted to within the scope of the claims without departing from the principles involved.

In the drawings:

Figure 1 is a view of a chain and lock embodying the invention applied in the operative position to a wheel.

Fig. 2 is a detail view of one of the links forming the retaining chain.

Fig. 3 is a similar view of the lock by which the brace chains are connected with the retaining chain, said lock being shown open.

Figs. 4 and 5 are respectively edge and side views of the lock as seen when closed.

The chain illustrated in Fig. 1 is composed of side retaining members composed of flat links 10 terminally connected in series by rings 11 which are in turn connected transversely of the wheel by the tread elements 12, and disposed diagonally or on lines parallel with tangents of the wheel are brace chains 13 of which the extremities are engaged with selected rings 11, as are the ends of the tread chain proper, by means of a lock illustrated in Figs. 3, 4 and 5 and indicated in operative relation with the chain as at 14.

This lock consists of the relatively movable members 15 and 16 pivotally connected as at 17 to form the connection for a link 18, and at the opposite end from the pivotal connection the member 15 is provided with a hook 19 constituting a seat for the free edge 20 of the other member. The member 16 is provided at its outer edge with a lip 21 folded inwardly to provide a groove 22 for the reception of the inner edge 23 of the member 15, while at the outer edge of the last-named member there is provided a rib 24 constituting a stop which contacts with the inner edge 25 of the member 16 to constitute a stop, limiting the inward swinging movement of the members.

At intermediate points the members 15 and 16 are provided with seats 26 and 27 for the reception of the terminal link at the other end of the chain or attached to the ring 11 with which connection is to be made. After arranging the chain link which is to be engaged between the members 15 and 16 and closing said members to occupy the relative positions indicated in Fig. 5, said link will engage both of the seats 26 and 27 which are by the closing of the lock arranged in registration, and obviously no possible strain applied to the chain or connected parts will cause the release or disengagement of the lock.

What is claimed is:

1. A device for connecting the extremities of a chain and consisting of a lock having pivotally connected members provided at intermediate points with registrable link seats, one of said members being provided with a terminal seat for the reception of the extremity of the other member, and the second-named member being provided with a side groove for the reception of the edge of the first-named member.

2. A device for connecting the extremities of a chain, the same consisting of a lock comprising pivotally connected members provided at intermediate points with registrable link seats, one of said members being provided at its free end with a seat for the reception of the free end edge of the other member, the second-named member having a side groove for the reception of the side edge of the first-named member, and said first-named member having a stop rib for contact with the corresponding edge of the second-named member to limit the relative pivotal movements of the members.

In testimony whereof I affix my signature.

PETER H. SPOELSTRA.